(12) United States Patent
Kim

(10) Patent No.: US 10,709,526 B2
(45) Date of Patent: Jul. 14, 2020

(54) DENTAL IMPLANT

(71) Applicant: DENFLEX CO., LTD, Seoul (KR)

(72) Inventor: Hyung Woo Kim, Goyang (KR)

(73) Assignee: DENFLEX CO., LTD, Seoul (KR)

( * ) Notice: Subject to any disclaimer, the term of this patent is extended or adjusted under 35 U.S.C. 154(b) by 0 days.

(21) Appl. No.: 15/763,715

(22) PCT Filed: Jan. 15, 2018

(86) PCT No.: PCT/KR2018/000695
§ 371 (c)(1),
(2) Date: Mar. 28, 2018

(87) PCT Pub. No.: WO2018/131974
PCT Pub. Date: Jul. 19, 2018

(65) Prior Publication Data
US 2019/0321143 A1    Oct. 24, 2019

(30) Foreign Application Priority Data

Jan. 13, 2017 (KR) .......................... 10-2017-0006426

(51) Int. Cl.
*A61C 8/00* (2006.01)
(52) U.S. Cl.
CPC .......... *A61C 8/0086* (2013.01); *A61C 8/0057* (2013.01)
(58) Field of Classification Search
CPC ....... A61C 8/0086; A61C 8/0057; A61C 8/00; A61C 8/062; A61C 8/0022; A61C 13/265
(Continued)

(56) References Cited

U.S. PATENT DOCUMENTS

| 5,782,918 A | 7/1998 | Klardie et al. |
| 2018/0147037 A1* | 5/2018 | Kim .......................... A61C 8/00 |

FOREIGN PATENT DOCUMENTS

| JP | 2003-530952 A | 10/2003 |
| KR | 10-06683680000 | 1/2007 |

(Continued)

OTHER PUBLICATIONS

International Search Report in related PCT patent application PCT/KR2018/000695. 3 pages.

*Primary Examiner* — Cris L. Rodriguez
*Assistant Examiner* — Mirayda A Aponte
(74) *Attorney, Agent, or Firm* — Nathan & Associates; Menachem Nathan

(57) ABSTRACT

The present invention provides a dental implant including: a fixture and an abutment including a coupling leg, and the fixture and the abutment are elastically coupled with each other, the dental implant including: a fixture axial hole inner inclined surface in which an inner diameter of an axial hole is gradually and downwardly reduced from a predetermined position of an inner inclined surface of the fixture; a first coupling part formed with a coupling hole at a predetermined position of the fixture; and a first associated coupling part formed with a coupling protrusion complementarily coupled with the first coupling part, wherein when the first associated coupling part is separated from the first coupling part by rotating the abutment, the coupling protrusion upwardly pushes the abutment from the fixture by elastic repulsion with the axial hole inner inclined surface of the fixture, thus the abutment becomes separated from the fixture.

9 Claims, 6 Drawing Sheets

(58) Field of Classification Search
USPC ........................ 433/173; 285/120.1, 137, 239
See application file for complete search history.

(56) References Cited

FOREIGN PATENT DOCUMENTS

| | | | | |
|---|---|---|---|---|
| KR | 10-13094170000 | | 9/2013 | |
| KR | 10-2014-0063037 A | | 5/2014 | |
| KR | 10-14017930000 B1 | | 5/2014 | |
| KR | 20-2014-0006435 U | | 12/2014 | |
| KR | 10-2015-0004560 A | | 1/2015 | |
| KR | 10-14876060000 B1 | | 1/2015 | |
| KR | 10-2015-0072363 A | | 6/2015 | |
| KR | 10-2015-0076570 A | | 7/2015 | |
| KR | 20150076570 A | * | 7/2015 | |
| KR | 10-2015-0089419 A | | 8/2015 | |
| KR | 10-2016-0072634 A | | 6/2016 | |
| KR | 20170008460 A | * | 1/2017 | ............... A61C 8/00 |
| KR | 101728424 B1 | | 5/2017 | |
| WO | 2017010711 A1 | | 1/2017 | |

\* cited by examiner

[FIG. 1]
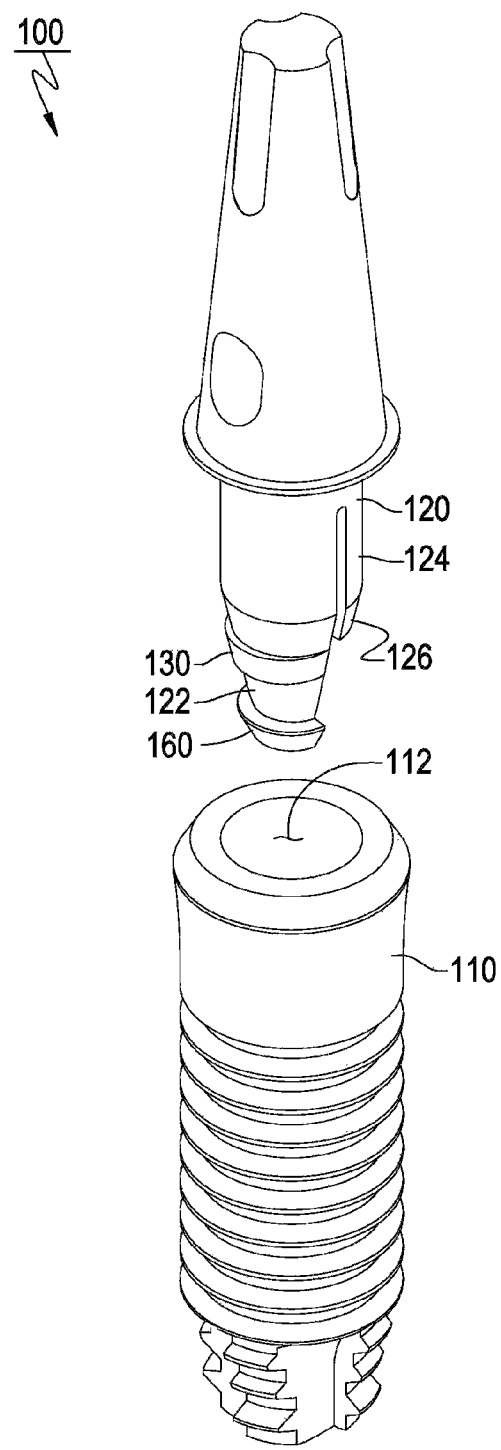

[FIG. 2]
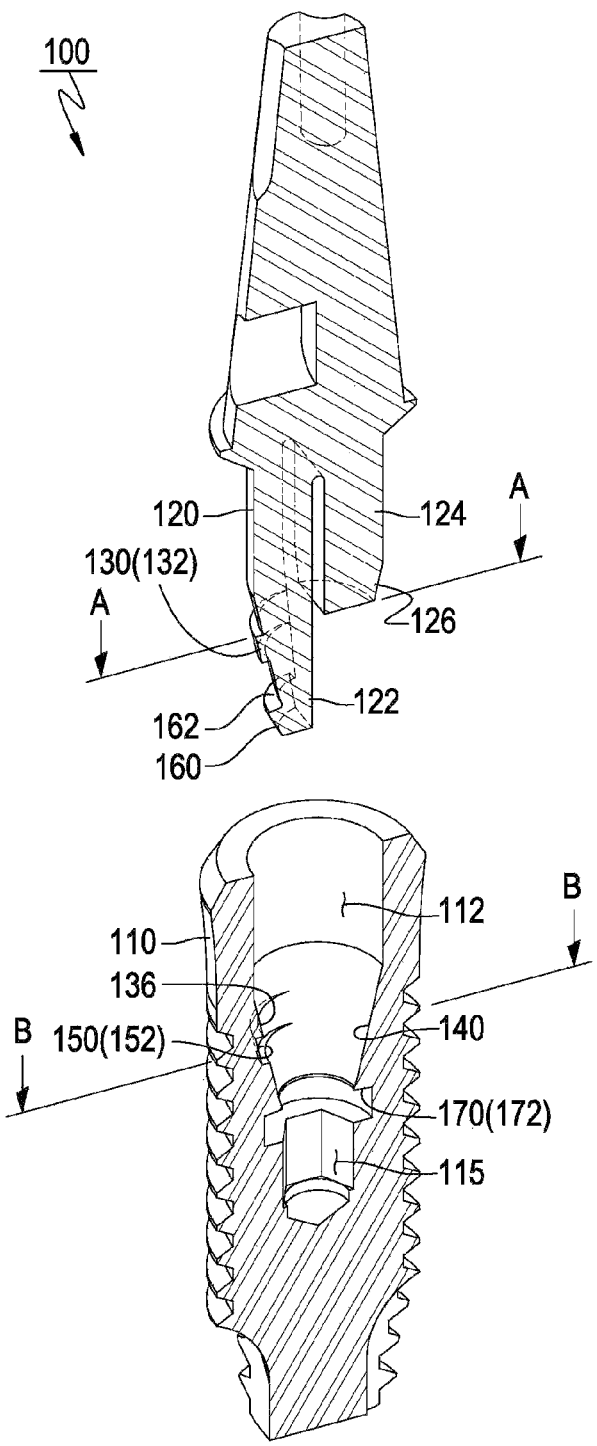

[FIG. 3]
(a)
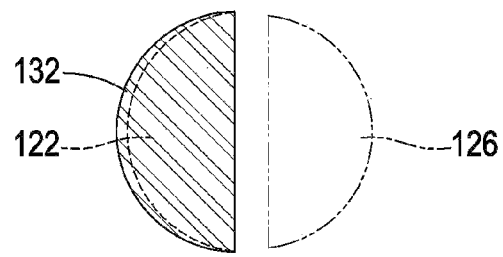
(b)
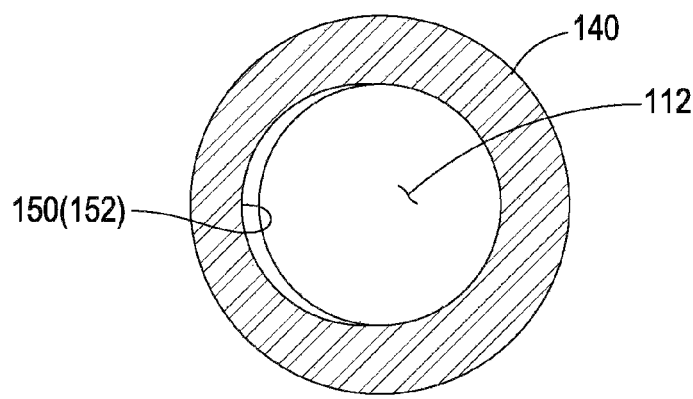
< B - B >

[FIG. 4]
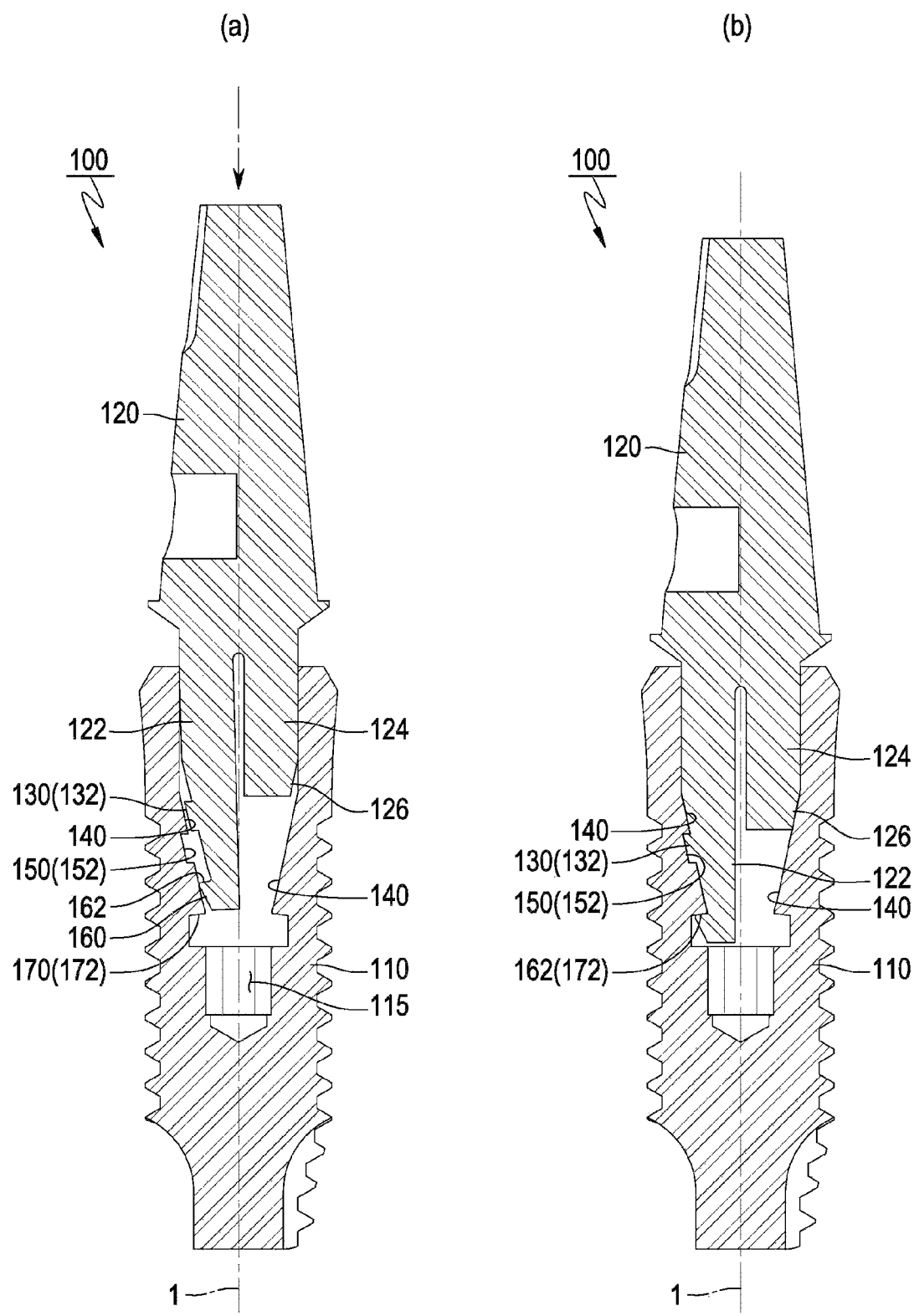

[FIG. 5]
(a)
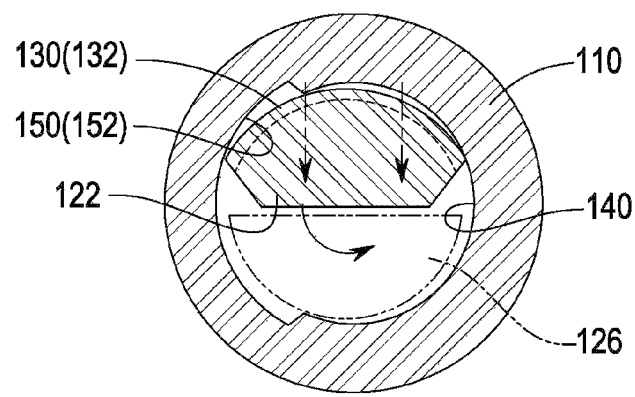
(b)
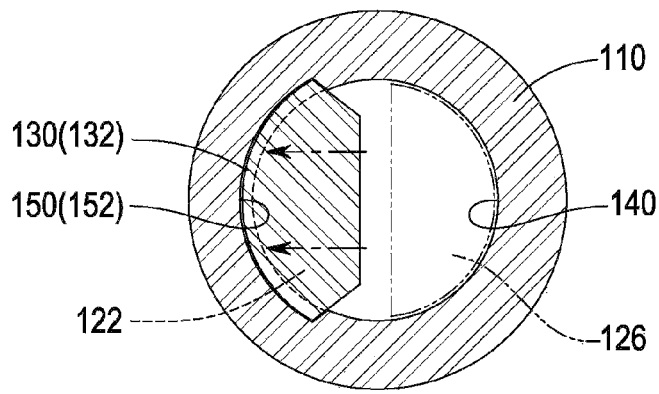
< B - B >

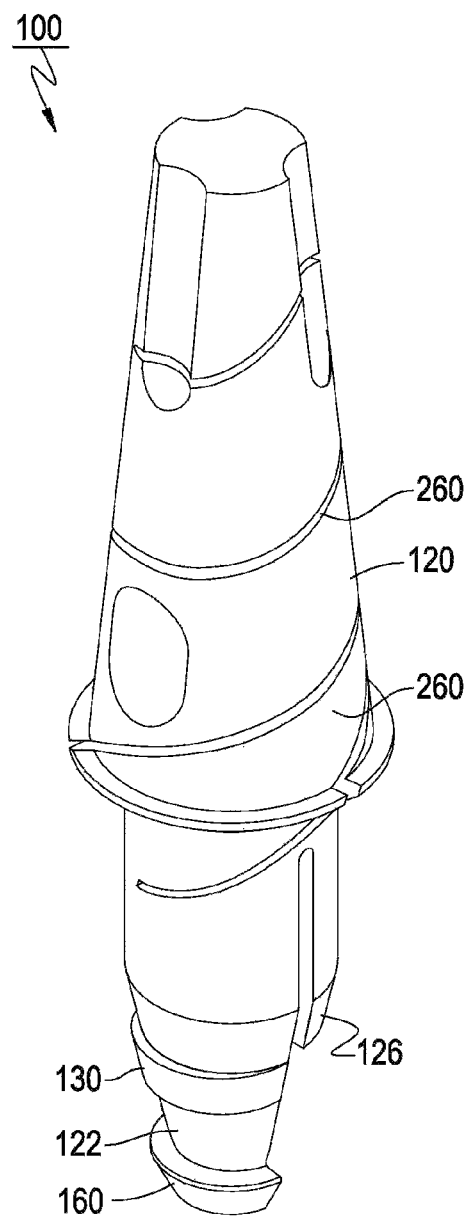
[FIG. 6]

DENTAL IMPLANT

CROSS REFERENCE TO RELATED APPLICATIONS

This application is a 371 application from international patent application PCT/KR2018/000695 filed Jan. 15, 2018, and is related to and claims priority from Korea Patent Application No. KR 10-2017-0006426 filed Jan. 13, 2017, which is incorporated herein by reference in its entirety.

TECHNICAL FIELD

The present invention relates to a dental implant fixing a dental prosthesis by forming an artificial tooth root that is coupled and implanted in the alveolar bone. More particularly, the present invention relates to a dental implant whereby an abutment is easily separated from a fixture of the dental implant, and vertical occlusal force applied thereto may be efficiently absorbed by improving a coupling structure between the fixture and the abutment.

BACKGROUND ART

In dentistry, an implant means an artificial tooth substituting for a lost natural tooth or a dental procedure that is conducted in such a manner that a fixture is implanted into a jawbone to be fused with the jawbone for a predetermined period, and prostheses such as a coupling member, artificial teeth, and the like are then fixed thereon so that the original functions of teeth can be recovered.

Although a typical prosthetic appliance or a typical false tooth damages surrounding teeth or bones according to the elapse of the time, an implanted tooth does not damage a surrounding tooth structure, and performs the function of an original tooth in the same shape as that of the original tooth. In addition, the implanted tooth is not decayed, so that the implanted tooth can be used for a long time.

Also, implants may facilitate the recovery of a single missing tooth and improve the function of an artificial tooth for a partially or completely edentulous patient, and may improve dental prosthesis recovery in terms of aesthetics. Furthermore, implants disperse an excessive stress applied on tissues of a support bone therearound, and contribute to stabilization of teeth in a row.

In the case of such an implant, a fixture implanted into a jawbone is coupled with a coupling part of an abutment with an upper axial hole of the fixture, and prosthesis is fixed on an upper part of the abutment.

In a conventional implant structure, a fixture and an abutment are thread-coupled, or a coupling hole of the fixture and a coupling protrusion of the abutment are elastically and complementarily coupled.

In a conventional thread-coupled structure, when a continuous load is repeatedly generated within the mouth as an implant wearer chews food, the screw coupling state becomes loose by being rotated since the screw slightly vibrates, and the oscillation width is gradually increased. Accordingly, a gap between the fixture and the abutment is generated. In other words, the artificial tooth shakes, thus the implant user may not easily chew the food, and undesirable mastication pressure may occur around the artificial tooth.

In addition, in the conventional implant structure, as described above, when coupling the abutment with the fixture, a thread-coupling may be performed while an accurate coupling position is not found. Accordingly, the artificial tooth and the alveolar bone may be damaged.

In addition, an implant unit having the above conventional implant structure has many difficulties in coupling the screw within a narrow oral cavity. Particularly, in the case of a patient whose surgical area is located on the back teeth side or who cannot widen his or her mouth widely, the implant procedure becomes more difficult.

As a conventional technique for solving such conventional problems, a dental implant of Korean Patent No. 10-0668368 has been proposed.

In the conventional technique, a dental implant includes: a fixture having an axial hole in an upper portion thereof and implanted into a jawbone; and an abutment having coupling legs made of a shape memory alloy, the legs being inserted into the axial hole of the fixture in a lower portion thereof and elastically coupled with the fixture so that teeth can be used to chew food. Herein, in the conventional technique, a coupling hole of the fixture formed with a concave form in an axial hole inner surface is formed in a vertical surface of the fixture inner surface.

Elastic coupling structures between the fixture and the abutment of the conventional technique have realized much technical advancement by effectively improving the thread-coupling problems. In addition, in actual use, it is very convenient to use since the coupling protrusion of the coupling leg is automatically and elastically coupled with the coupling hole of the fixture when the abutment is inserted within the fixture.

However, the above elastic coupling structures between the fixture and the abutment of the conventional technique cause inconvenience when separating the abutment from the fixture, and are not able to effectively perform buffer functions when vertical occlusal force is applied.

In other words, in order to separate the abutment from the fixture, the abutment is upwardly pulled with respect to the fixture by force such that the coupling protrusion or the coupling hole formed in the coupling leg is detached from the coupling hole or the coupling protrusion that is formed in the axial hole inner surface of the fixture in association by being upwardly pulled, or the abutment is separated from the fixture by rotating the abutment with respect to the fixture and upwardly pulling the fixture.

However, upwardly pulling the abutment with respect to the fixture by force as described above may apply large force to the alveolar bone of the patient through the fixture. As a result, there is great risk of damaging the alveolar bone of the patient due to excessive force. In addition, the associated coupling part and the coupling part which are configured with the coupling protrusion and the coupling hole formed in the abutment and the axial hole inner surface of the fixture become worn down due to repeated attachments and detachments, thus coupling force is reduced.

Further, in order to separate the abutment from the fixture without damaging the fixture or the abutment, or the alveolar bone, an extraction device disclosed in Korean Patent No. 10-1309417 should be used. However, when the fixture is deeply implanted from the upper part of the alveolar bone, the extraction device may not be used.

In addition, in the conventional technique described above, the operator may require a large force to upwardly pull the abutment with respect to the fixture y force, and such a procedure may act as a considerable mental burden on the implant procedure.

In addition, in the conventional technique described above, the implant structure may perform a buffer function for horizontal pressure, but a buffer function for vertical occlusion pressure may not be performed. Accordingly, there is a need for a structure that effectively performs a buffer function for vertical occlusion pressure.

DISCLOSURE

Technical Problem

Accordingly, the present invention has been made keeping in mind the above problems occurring in the prior art, and an object of the present invention is to provide an improved dental implant in which an associated coupling part formed in a lower part of an abutment and a coupling part formed in an axial hole inner surface of a fixture in association with the associated coupling part are separated from each other with less force when separating the abutment from the fixture. In addition, although the abutment is rotated with excessive force, the fixture and the abutment are not re-coupled by being rotated again at a predetermined angle. Further, coupling force for performing a function of preventing a vertical directional separation in case of repeated attachments and detachments is not reduced, and the abutment is easily separated from the fixture by upwardly pulling the abutment with less force.

In addition, another object of the present invention is to provide an improved dental implant in which an operator may easily detect a separation state between the abutment and the fixture since the abutment is separated by being automatically and upwardly pushed from the fixture by rotating the abutment. Accordingly, the operator may procedure an implant procedure without difficulty and burdens.

Another object of the present invention is to provide a dental implant in which an inclined surface is provided on a lower outer surface of the elastic unfastening support leg of the abutment, and a corresponding inclined surface, corresponding to the inclined surface of the elastic unfastening support leg, is provided on an inner surface of the axial hole of the fixture. When occlusal force is applied to the abutment, the inclined surface of the elastic non-fastening support leg of the abutment absorbs the occlusal force while sliding along the corresponding inclined surface on the inner surface of the axial hole of the fixture.

Another object of the present invention is to provide a dental implant in which a linear or spiral slit is provided in a portion between the top portion and the bottom portion of the abutment coupled to the fixture, such that the abutment has a function of absorbing a significant amount of external force, including chewing pressure, applied to the implant. It is therefore possible to distribute stress applied to the abutment across entire portions thereof and prevent stress from being concentrated in a specific portion of the abutment. It is also possible to significantly improve the sensation of chewing and endurance of the implanted tooth.

In addition, another object of the present invention is to provide an improved dental implant in which a rotation with respect to rotation force equal to or less than a predetermined value within the axial hole of the fixture is prevented without adding an additional rotation prevention form in the coupling axial part of the abutment. Further, another object of the present invention is to provide an improved dental implant in which attachments and detachments between the fixture and the abutment are easily performed even though the fixture is deeply implanted from an upper part of an alveolar bone.

In addition, another object of the present invention is to provide an improved dental implant in which vertical occlusal force is effectively absorbed.

Hereinafter, for convenience of description, a function of preventing the abutment being rotated with respect to the fixture for rotation force equal to or less than a predetermined value is defined as "rotation prevention function", and a function of preventing the abutment being separated from the fixture in a vertical direction is defined as "vertical separation prevention function".

Technical Solution

In order to accomplish the above object, one embodiment of the present invention provides a dental implant comprising a fixture implanted in an alveolar bone to provide an artificial tooth root, and an abutment comprising elastic legs respectively comprising a top portion coupled to a prosthesis and a bottom portion elastically coupled to an axial hole of the fixture, wherein the elastic legs include an elastic fastening leg acting to couple the abutment to the fixture using elastic bending in an axial direction and restoring force and an elastic non-fastening support leg that does not directly participate in coupling of the abutment to the fixture, wherein a first fastening portion is provided on an inner surface of the axial hole of the fixture, the first fastening portion comprising a concave-convex portion, such as a fastening recess depressed outward, in a predetermined location on the inner surface of the axial hole, and a first corresponding fastening portion is provided on an outer circumferential surface of the elastic fastening leg to be complementarily coupled to the first fastening portion provided on the inner surface of the axial hole of the fixture, and has a fastening protrusion, wherein the first fastening portion comprises at least one first fastening portion provided in a circumferential direction of the inner surface of the axial hole of the fixture so as not to provide an annular shape along the entire circumference, such that the abutment is coupled to the fixture at a predetermined angle when the abutment is pushed into the fixture and the first corresponding fastening portion of the abutment is releasable from the first fastening portion when the abutment is rotated in the circumferential direction by a predetermined level of torque or higher applied thereto, and wherein, in a position in which the abutment is fitted into the fixture by complementary fastening between the first fastening portion and the first corresponding fastening portion, at a predetermined level of torque or lower, a function of preventing the abutment from rotating with respect to the fixture is performed, and at a predetermined level of torque or higher, the elastic fastening leg of the abutment is elastically bent in an inner diameter direction, and the abutment rotates in the circumferential direction, allowing the fastening protrusion of the first corresponding fastening portion to be released from the fastening recess of the first fastening portion, so that the fixture and the abutment are decoupled from each other.

Another embodiment of the present invention provides a dental implant comprising a fixture implanted in an alveolar bone to provide an artificial tooth root, and an abutment comprising elastic legs respectively comprising a top portion coupled to a prosthesis and a bottom portion elastically coupled to an axial hole of the fixture, wherein the elastic legs include an elastic fastening leg acting to couple the abutment to the fixture using elastic bending in an axial direction and restoring force and an elastic non-fastening support leg that does not directly participate in coupling of the abutment to the fixture, wherein a first fastening portion is provided on an inner surface of the axial hole of the fixture, the first fastening portion comprising a concave-convex portion, such as a fastening recess depressed outward, in a predetermined location on the inner surface of the axial hole, and a first corresponding fastening portion is provided on an outer circumferential surface of the elastic fastening leg to be complementarily coupled to the first fastening portion provided on the inner surface of the axial hole of the fixture, and has a fastening protrusion, wherein the first fastening portion comprises at least one first fastening portion provided in a circumferential direction of the inner surface of the axial hole of the fixture so as not to provide an annular shape along the entire circumference, such that the abutment is coupled to the fixture at a predetermined angle when the abutment is pushed into the fixture and the first corresponding fastening portion of the abutment is releasable from the first fastening portion when the abutment is rotated in the circumferential direction by a predetermined level of torque or higher applied thereto, wherein a second corresponding fastening portion is provided on an outer circumferential surface of the elastic fastening leg provided on one portion of a lower fastening shaft of the abutment, the second corresponding fastening portion comprising a fitting protrusion protruding from the outer circumferential surface of the elastic fastening leg in an outer diameter direction to prevent the abutment from being vertically decoupled from the fixture, and a second fastening portion is provided on the inner surface of the axial hole of the fixture, the second fastening portion comprising a stepped portion extending outward to be coupled to the second corresponding fastening portion in a corresponding manner, and wherein, when the first fastening portion and the first corresponding fastening portion are fastened to each other, the second corresponding fastening portion and the second fastening portion are fastened to each other to enhance axial coupling force between the abutment and the fixture, and when the first corresponding fastening portion is released from the first fastening portion in response to the abutment rotating in the circumferential direction, the second corresponding fastening portion is automatically released from the second fastening portion provided on the inner surface of the axial hole of the fixture by elastic bending of the elastic fastening leg of the abutment in an inner diameter direction, so that the fixture and the abutment are decoupled from each other.

Advantageous Effects

According to the present invention, the present invention includes a first associated coupling part that mainly performs a rotation prevention function is formed in a lower part of an abutment, and a first coupling part formed inside an axial hole of a fixture at a position that is in association with the first associated coupling part so that the first coupling part is complementarily coupled with the first associated coupling part.

Accordingly, according to the present invention, when separating the abutment from the fixture, the abutment and the fixture are easily separated by upwardly pulling the abutment from the fixture since the first associated coupling part is separated from the first coupling part when the abutment is rotated with respect to the fixture.

In addition, according to the present invention, an inclined surface is provided on the inner surface of the axial hole of the fixture, on which the first fastening portion is provided, except for a region of the inner surface in which the first fastening portion is provided, such that an inner diameter of the inclined surface continuously decreases in a bottom direction. When a fastening protrusion of the first corresponding fastening portion is released from the fastening recess of the first fastening portion in response to the abutment being rotated in the circumferential direction, the fastening protrusion of the first corresponding fastening portion pushes the abutment upwards from the fixture due to elastic repulsion from the inclined surface of the inner surface of the axial hole of the fixture, thereby automatically decoupling the abutment and the fixture from each other. In addition, according to the present invention, when the abutment is rotated with respect to the fixture, the abutment is automatically pushed upwards. Consequently, even if the abutment is rotated again, the abutment can be prevented from being recoupled to the fixture.

In addition, according to the present invention, when separating the abutment from the fixture, the abutment is separated from the fixture, and is automatically and upwardly protruded when the abutment is rotated with respect to the fixture. Accordingly, the operator may easily detect a separation state between the abutment and the fixture. Thus, the implant procedure may easily and conveniently progress without difficulty and worry. In addition, according to the present invention, an additional polygonal form for a rotation prevention function is not provided to the abutment. In addition, according to the present invention, when vertical occlusal force is applied to the abutment, the inclined surface may effectively absorb vertical occlusal pressure.

Furthermore, according to the present invention, the inclined surface is provided on the lower outer surface of the elastic unfastening support leg of the abutment, and the corresponding inclined surface, corresponding to the inclined surface of the elastic unfastening support leg, is provided on the inner surface of the axial hole of the fixture. When occlusal force is applied to the abutment, the inclined surface of the elastic non-fastening support leg of the abutment absorbs the occlusal force while sliding along the corresponding inclined surface on the inner surface of the axial hole of the fixture.

In addition, according to the present invention, the linear or spiral slit is provided in a portion between the top portion and the bottom portion of the abutment coupled to the fixture, such that the abutment has a function of absorbing a significant amount of external force, including chewing pressure, applied to the implant. It is therefore possible to distribute stress applied to the abutment across entire portions thereof and prevent stress from being concentrated in a specific portion of the abutment. It is also possible to significantly improve the sensation of chewing and endurance of the implanted tooth.

DESCRIPTION OF DRAWINGS

FIG. 1 is an external perspective view showing a coupling structure in which an abutment of a coupling leg type is coupled to a fixture in a dental implant according to the present invention;

FIG. 2 is a longitudinal sectional view showing a dental implant according to the present invention;

FIG. 3(a) is a sectional plan view of a first associated coupling part that performs a rotation prevention function in the dental implant according to the present invention, and is a sectional plan view of FIG. 2 along an A-A line;

FIG. 3(b) is a sectional plan view of a first coupling part that performs a rotation prevention function in the dental implant according to the present invention, and is a sectional plan view of FIG. 2 along a B-B line;

FIG. 4(a) is a longitudinal sectional view showing a coupling intermediate state between the abutment and the fixture in the dental implant according to the present invention;

FIG. 4(b) is a longitudinal sectional view showing a coupled state between the abutment and the fixture in the dental implant according to the present invention;

FIG. 5(a) is a sectional planar view showing an intermediate coupling process between the abutment and the fixture in the dental implant according to the present invention;

FIG. 5(b) is a sectional planar view showing a coupled state between the abutment and the fixture in the dental implant according to the present invention;

FIG. 6 is a perspective view showing a spiral slit structure formed in an abutment of a dental implant according to the present invention.

Mode for Invention

Hereinafter, preferred embodiments of the present invention will be described in detail with reference to the accompanied drawings.

As illustrated in FIGS. 1 and 2, a dental implant 100 according to the present invention includes a fixture 110 implanted in an alveolar bone (not shown) to form an artificial tooth root, and an abutment 120 comprised of elastic legs 122 and 124. In each of the elastic legs 122 and 124, a top portion thereof is coupled to a prosthesis (e.g. a crown or a denture), and a bottom portion thereof is elastically coupled to an axial hole 112 of the fixture 110.

The elastic legs 122 and 124 of the abutment 120 include an elastic fastening leg 122 acting to couple the abutment 120 to the fixture 110 using elastic bending in the axial direction and restoring force, and an elastic non-fastening support leg 124 that does not directly participate in the coupling of the abutment 120 to the fixture 110. Although the elastic legs are illustrated herein as including a single elastic fastening leg 122 and a single elastic non-fastening support leg 124 with reference to the drawings for the convenience of description, it will be apparent to persons skilled in the art that a plurality of elastic fastening legs and a plurality of elastic non-fastening support legs may be provided. It should be understood, therefore, that neither the number of the elastic fastening legs nor the number of the elastic non-fastening support legs shall be limited in the interpretation of the scope of the present invention.

The elastic fastening leg 122 is an elastic leg acting to restrain the abutment 120, fastened to the fixture 110, from rotating in the axial hole 112 of the fixture 110 in the circumferential direction or escaping upwards from the fixture 110, using elastic bending in the central axial direction and restoring force thereof. In contrast, the elastic non-fastening support leg does not have the former function, without directly participating in the fastening of the abutment to the fixture.

As illustrated in FIGS. 2, 3(a) and 3(b), a first fastening portion 150 is provided on the inner surface of the axial hole 112 of the fixture. The first fastening portion 150 includes a concave-convex portion, more particularly, a fastening recess 152 depressed outward in a predetermined location on the inner surface of the axial hole 112. A first corresponding fastening portion 130 is provided on an outer circumferential surface of the elastic fastening leg 122 to be complementarily coupled to the first fastening portion 150 provided on the inner surface of the axial hole 112 of the fixture, and has a fastening protrusion 132.

When the abutment 120 is rotated in a position fitted into the axial hole 112 of the fixture 110 as illustrated in FIG. 5(a), the fastening protrusion 132 provided on the outer circumferential surface of the abutment 120 is complementarily coupled to the outwardly-depressed fastening recess 152 in the inner surface of the axial hole 112 of the fixture 110 as illustrated in FIG. 5(b), so that the abutment 120 is coupled to the fixture 110.

The first fastening portion 150 is configured such that at least one portion thereof is depressed outward when viewed from the cross-section taken perpendicularly with respect to the vertical central axis of the axial hole 112 of the fixture 110. As illustrated in FIGS. 2 to 5(b), at least one first fastening portion 150 is provided in the circumferential direction of the inner surface of the axial hole 112 of the fixture 110 so as not to provide an annular shape along the entire circumference. Since at least one first fastening portion 150 is provided in a specific angle in the circumferential direction, the abutment 120 is coupled to the fixture 110 at a predetermined angle when the abutment 120 is pushed into the fixture 110. When the abutment is rotated in the circumferential direction by a predetermined level of torque or higher applied thereto, the first corresponding fastening portion 130 of the abutment may be released from the first fastening portion 150. Although the first corresponding fastening portion 130 and the first fastening portion 150 may have different vertical lengths, horizontal lengths thereof in the circumferential direction must be within a mechanical tolerance represented as a numerical value. Otherwise, excessive microscopic shaking may be caused by a predetermined level of torque or lower.

The above-described first fastening portion 150 may be comprised of the fastening recess 152 in the inner surface of the axial hole, the fastening recess 152 corresponding to and being complementarily coupled to the fastening protrusion 132 of the first corresponding fastening portion 130. The fastening recess and the fastening protrusion may have a variety of shapes. The first corresponding fastening portions provided on the fastening legs may not have the same shape. Accordingly, the first fastening portions complementarily coupled to the first corresponding fastening portions may have different shapes.

In a position in which the abutment 120 is fitted into the fixture 110 by complementary fastening between the first fastening portion 150 and the first corresponding fastening portion 130, the rotation of the abutment with respect to the fixture is prevented at a predetermined level of torque or lower. At a predetermined level of torque or higher, the elastic fastening leg of the abutment is elastically bent in the inner diameter direction. This consequently causes the abutment to rotate in the circumferential direction, allowing the fastening protrusion 132 of the first corresponding fastening portion 130 to be released from the fastening recess 152 of the first fastening portion 150, so that the fixture 110 is decoupled from the abutment 120.

More particularly, an inclined surface 140 may be provided on the inner surface of the axial hole 112 of the fixture 110 such that the inner diameter thereof decreases downward from a predetermined position. Specifically, since the inclined surface 140 of the axial hole 112 of the fixture 110 has a conical structure, the inner diameter of which decreases downward from a predetermined position on the inner surface of the axial hole of the fixture 110.

At the same vertical position of the inner surface of the axial hole 112 in which the first fastening portion 150 is provided, the inclined surface 140 may be provided on the inner surface of the axial hole 112, except for a region of the inner surface in which the first fastening portion 150 is provided, such that the diameter of the inclined surface 140 continuously decreases in a bottom direction of the axial hole 112. In this case, in the process of separating the abutment 120 from the fixture 110, when the abutment 120 is rotated with respect to the fixture 110, the first corresponding fastening portion 130 pushes the abutment 120 upwards from the fixture 110 due to elastic repulsion from the inclined surface 140 while being released from the first fastening portion 150, so that the abutment 120 and the fixture 110 can be more easily separated.

As illustrated in FIGS. 1 and 2, the elastic non-fastening support leg 124 of the abutment 120 has an inclined surface 126 provided on a lower outer surface thereof to be inclined downward, and a corresponding inclined surface 136 corresponding to the inclined surface 126 of the elastic non-fastening support leg 124 is provided on the inner surface of the axial hole 112 of the fixture 110. This configuration can effectively absorb vertical occlusal force applied to the abutment 120.

The inclined surface 126 of the elastic non-fastening support leg 124 and the corresponding inclined surface 136 on the inner surface of the axial hole 112 of the fixture 110 provide a mutually-coupled structure while being in contact with each other. When occlusal force is applied to the abutment 120, the inclined surface 126 of the elastic non-fastening support leg 124 of the abutment 120 absorbs the occlusal force while slightly sliding along the corresponding inclined surface 136 on the inner surface of the axial hole 112 of the fixture 110.

In this case, at the same vertical position, the outer diameter of the inclined surface of the elastic non-fastening support leg 124 is greater than the inner diameter of the corresponding inclined surface 136 on the inner surface of the axial hole 112 of the fixture 110. When the abutment 120 is coupled to the fixture 110, a constant level of force is applied to push the abutment upwards with respect to the fixture, so that the abutment can be firmly located at a constant position with respect to the fixture.

Due to complementary fastening between the first corresponding fastening portion 130 provided on the elastic fastening leg 122 and the first fastening portion 150 provided on the inner surface of the axial hole 112 of the fixture 110, it is possible to prevent the abutment from rotating against a predetermined level of torque or lower and prevent the abutment from being vertically decoupled from the fixture.

In contrast, according to another embodiment of the present invention, a second corresponding fastening portion 160 may be provided below or above the first corresponding fastening portion 130 to protrude radially outward of the abutment 120. The second corresponding fastening portion 160 has a vertical release prevention function as a main function thereof. The second corresponding fastening portion 160 may be provided on a location of the fastening leg, below the first corresponding fastening portion 130.

In the second corresponding fastening portion 160 having a vertical release prevention function as a main function thereof, as illustrated in FIG. 2, a fastening surface 162 is provided on a top surface of a fastening protrusion protruding in a radial direction of the abutment 120. The second corresponding fastening portion 160, comprised of the fastening protrusion and having a vertical release prevention function as a main function thereof, may be configured such that the radius of a longitudinal cross-section thereof decreases downward.

In addition, a second fastening portion 170 may further be provided on the inner surface of the axial hole 112 of the fixture 110. The second fastening portion 170 is depressed outward to provide a stepped portion corresponding to the second corresponding fastening portion 160.

The second fastening portion 170 may be an annular stepped portion provided in a predetermined vertical position on the inner surface of the axial hole 112 of the fixture 110 to extend along the entire circumference. Alternatively, the second fastening portion 170 may be a concave-convex portion like the first fastening portion, more particularly, a fastening recess depressed outward in a predetermined location, instead of being provided as an annular stepped portion extending along the entire circumference.

In addition, the first fastening portion and the second fastening portion may be integrated as a single fastening portion.

The second fastening portion 170, provided as the stepped portion as described above, has a second fastening surface 172 corresponding to the fastening surface 162 of the second corresponding fastening portion 160.

Regarding the second corresponding fastening portion 160 and the second fastening portion 170 as described above, when the first corresponding fastening portion 130 is separated from the first fastening portion 150, the second corresponding fastening portion 160 is in a position of having been automatically released from the second fastening portion 170 by elastic bending of the elastic fastening leg 122 in the inner diameter direction.

However, when the first corresponding fastening portion 130 and the first fastening portion 150 are fastened to each other, as illustrated in FIGS. 4(*a*) and 4(*b*), the second corresponding fastening portion 160 and the second fastening portion 170 are simultaneously coupled to each other, thereby enhancing axial coupling force between the abutment 120 and the fixture 110. Due to this operation, the second corresponding fastening portion 160 and the second fastening portion 170 having the vertical release prevention function as a major function can continuously maintain coupling force for preventing vertical release without being damaged even if attachment and detachment are repeatedly performed.

When it is intended to couple the abutment 120 to the fixture 110, the dental implant 100 having above-described configuration completely pushes the abutment 120 into the axial hole 112 of the fixture 110 and radially rotates the abutment 120.

Consequently, the fastening protrusion 132 of the first corresponding fastening portion 130 provided on the elastic fastening leg 122 of the abutment 120 is fastened to the fastening recess 152 provided on the inner surface of the axial hole 112 of the fixture 110.

In contrast, when it is intended to decouple the abutment 120 from the fixture 110, the abutment 120 is rotated in the circumferential direction within the fixture 110.

In the dental implant 100 according to the present invention, in a position in which the abutment 120 is fitted into the fixture 110, when the abutment 120 is rotated in the circumferential direction, the first corresponding fastening portion 130 is released from the first fastening portion 150 in the circumferential direction, and at the same time, the second corresponding fastening portion 160 having the vertical release prevention function as a major function is automatically released from the second fastening portion 170.

When the first corresponding fastening portion 130, having the function of preventing the rotation of the abutment with respect to the fixture in the circumferential direction as a major function, is released from the first fastening portion 150 in the circumferential direction by a predetermined level of torque or higher, the second corresponding fastening portion 160 having the vertical release prevention function as a major function is also released from the second fastening portion 170. In this position, it is possible to easily decouple the abutment 120 from the fixture 110 by pulling the abutment 120 upwards.

According to the present invention as described above, the abutment 120 can be separated from the fixture 110 by using a small amount of force, a large amount of force may not be applied to an alveolar bone of a patient as in the related art, and coupling force for preventing the abutment from being vertically decoupled from the fixture may not be reduced even if attachment and detachment are repeatedly performed.

According to the present invention as described above, it is possible to minimize a patient injury risk in an implant procedure. It is also possible to decouple the abutment 120 from the fixture 110 by only rotating the abutment 120, so that a medical practitioner can easily recognize the state of separation of the abutment 120 and the fixture 110 and thus easily perform the implant procedure without mental burden. Accordingly, the implant procedure can be performed very conveniently.

The first fastening portion 150 may be provided with the fastening recess 152 extending downward from the top end in the inner surface of the axial hole 112 of the fixture 110, so that the coupling position of the fixture and the abutment can be more easily determined during a procedure. Specifically, the axial hole 112 of the fixture 110 is configured such that the diameter of the inner surface thereof above the first fastening portion 150 is not smaller than the outer diameter of the first corresponding fastening portion 130, so that the first corresponding fastening portion 130 can enter the first fastening portion 150 without significant resistance. Furthermore, since the first fastening portion 150 guides the fastening protrusion 132 of the first corresponding fastening portion 130 of the abutment 120 that is fitted into the axial hole 112 of the fixture 110, the medical practitioner can easily determine the coupling angle and position of the fixture 110 and the abutment 120 by aligning the fastening protrusion 132 of the abutment 120 with the first fastening recess 152 of the fixture and then pushing the abutment 120 into the axial hole 112.

As illustrated in FIG. 6, a slit may be further provided between the top portion of the abutment 120 and the first fastening portion 150 to linearly or spirally extend in a top-bottom direction of the abutment 120 while dividing the cross-section into a plurality of segments.

Specifically, as illustrated in FIG. 6, the spiral slit 260, including the top point to the bottom point, extends through the abutment 120 in a transverse direction to divide the horizontal cross-section of the abutment 120 into a plurality of segments. When viewed from the outer side surface of the abutment 120, the spiral slit 260 has a spiral shape continuously extending in the top-bottom direction of the abutment 120.

According to this structure, when external force is applied to the abutment 120, the spiral slit 260 can provide absorbing ability to the abutment 120 to reduce impacts applied to the fixture 110 coupled to the alveolar bone. In addition, when a patient having the implant chews food, the patient can sense a minute pressure absorbing action. Accordingly, the sensation of chewing of the patient can be significantly improved.

As illustrated in FIG. 2, the fixture 110 according to an embodiment of the present invention may further include a fastening cavity 115 in the bottom end of the axial hole 112 of the fixture 110. The fastening cavity 115 has a polygonal shape when viewed from the horizontal cross-section. This configuration is intended to help the medical practitioner to perform a procedure by fitting one end of a dental tool into the fastening recess 115 of the fixture when implanting the fixture 110 into an alveolar bone of the patient.

In addition, in the dental implant according to the present invention, although the outer diameter of the abutment coupled to the top portion of the axial hole of the fixture in a corresponding manner is greater than the inner diameter of the top portion of the axial hole of the fixture before the abutment and the fixture are coupled, when the abutment is fitted into the fixture, the abutment is radially contracted toward the central axis thereof by the slit provided therein. Consequently, the outer diameter of the contracted abutment corresponds to the inner diameter of the top portion of the axial hole of the fixture, so that the abutment can be firmly coupled to the axial hole of the fixture. After coupling, the abutment presses against the inner surface of the axial hole of the fixture outwards while being elastically restored from the contracted position, thereby supporting the fixture. In this manner, the abutment and the fixture can be more firmly coupled. The above-described structure can significantly improve sealing performance in joining portions of the abutment and the fixture, thereby minimizing microscopic apertures or gaps in the joining portions. This can fundamentally overcome the problem of external bacteria or germs penetrating into the fixture.

Although embodiments have been described with reference to a number of illustrative embodiments thereof, it is to be understood that the invention is not limited to this specific structure. Rather, modifications and changes will be apparent to a person having ordinary skill in the art without departing from the principle of the invention defined in the following claims. For example, strong rotation force may be applied to the fixture by forming a polygonal form in the axial hole inner surface of the fixture or a lower part thereof when implanting the fixture in the alveolar bone. For example, a single coupling part in which functions of the first coupling part and the second coupling part are integrated may be formed. Herein, the structure, that is configured to enable easy separation of the abutment from the fixture by contacting the associated coupling part formed in the lower part of the abutment with the axial hole inner inclined surface formed in the axial hole inner surface of the fixture, and by upwardly pushing the abutment by elastic repulsion when the abutment is rotated while the abutment is coupled with the fixture is not changed. In addition, forms of the first coupling part and the first associated coupling part that mainly performs a rotation prevention function and the first associated coupling part may be not associated 100%. In other words, although the forms of the first coupling part and the first associated coupling part do not complementarily associate 100%, it is only necessary to be able to perform a rotation prevention function for rotation force equal to or less than a predetermined value. As another example, both of the first and second associated coupling parts may not be formed in the coupling leg. In other words, the first and second associated coupling parts may be formed in a part of the coupling legs. As another example, the first coupling part or the first associated coupling part which are circular may have various forms other than a circular form. In addition, one coupling legs 122 are formed in the example of the figure. However, one to six or more coupling legs 122 may be formed, and the first associated coupling part 130 may be formed in each coupling leg 122. In association with this, the first coupling part 150 may be formed. In addition, the second coupling part may have various coupling angles and forms depending on the vertical central axis. In other words, the planar surface of the second associated coupling part may be formed to have a gradual angle rather than the planar surface. In addition, as another example, the inclined surface in which the first coupling part is formed may be formed in a stepped form rather than a continuous surface. Meanwhile, whichever coupling method in which the abutment is coupled with the fixture, as the method in which the coupling protrusion and the coupling hole are elastically coupled with each other by elastic repulsion thereof, it should be construed that the structure, in which the abutment and the fixture are easily separated by upwardly pushing the abutment from the fixture by elastic repulsion between the coupling protrusion of the associated coupling part formed in the lower part of the abutment and the inclined surface formed in the axial hole inner surface of the fixture when the abutment is rotated while the abutment is coupled with the fixture, is included in the scope of the present invention. In other words, it should be construed that all cases in which the first coupling part formed with the coupling hole in the inclined surface of the axial hole inner surface of the fixture and which is elastically coupled with the abutment is included, and the abutment and the fixture are easily separated from each other, by upwardly pushing the abutment from the fixture by elastic interaction between the inclined surface of the axial hole inner surface of the fixture and the first associated coupling part formed in the lower part of the abutment when the abutment is rotated with respect to the fixture while the abutment and the fixture are coupled with each other since the first associated coupling part is formed in the abutment in association with the first coupling part are included in the scope of the present invention. In addition, a simple design modification including technical characteristic of the present invention may be included within the spirit and scope of the present invention.

What is claimed is:

1. A dental implant comprising:
    a fixture implanted in an alveolar bone to provide an artificial tooth root; and
    an abutment comprising elastic legs respectively comprising a top portion coupled to a prosthesis and a bottom portion elastically coupled to an axial hole of the fixture,
    wherein the elastic legs include an elastic fastening leg acting to couple the abutment to the fixture using elastic bending in an axial direction and restoring force, and
    an elastic non-fastening support leg that does not directly participate in coupling of the abutment to the fixture, wherein the elastic non-fastening support leg has an inclined surface provided on a lower outer surface thereof to be inclined downward, and wherein the fixture has a corresponding inclined surface provided on the inner surface of the axial hole, corresponding to the inclined surface of the elastic non-fastening support leg, such that vertical occlusal force applied to the abutment is effectively absorbed,
    wherein a first fastening portion is provided on an inner surface of the axial hole of the fixture, the first fastening portion comprising a fastening recess depressed outward, in a predetermined location on the inner surface of the axial hole, and a first corresponding fastening portion is provided on an outer circumferential surface of the elastic fastening leg to be complementarily coupled to the first fastening portion provided on the inner surface of the axial hole of the fixture, and has a fastening protrusion,
    wherein the inclined surface of the elastic non-fastening support leg and the corresponding inclined surface on the inner surface of the axial hole of the fixture provide a mutually-coupled structure while being in contact with each other, such that, when occlusal force is applied to the abutment, the inclined surface of the elastic non-fastening support leg of the abutment absorbs the occlusal force while slightly sliding along the corresponding inclined surface on the inner surface of the axial hole of the fixture,
    wherein the first fastening portion comprises at least one first fastening portion provided in a circumferential direction of the inner surface of the axial hole of the fixture so as not to provide an annular shape along the entire circumference, such that the abutment is coupled to the fixture at a predetermined angle when the abutment is pushed into the fixture and the first corresponding fastening portion of the abutment is releasable from the first fastening portion when the abutment is rotated in the circumferential direction by a predetermined level of torque or higher applied thereto, and
    wherein, in a position in which the abutment is fitted into the fixture by complementary fastening between the first fastening portion and the first corresponding fastening portion, when a torque applied to the abutment is lower than a predetermined level, a function of preventing the abutment from rotating with respect to the fixture is performed, and when the torque applied to the abutment is equal to or higher than the predetermined level, the elastic fastening leg of the abutment is elastically bent in an inner diameter direction, and the abutment rotates in the circumferential direction, allowing the fastening protrusion of the first corresponding fastening portion to be released from the fastening recess of the first fastening portion, so that the fixture and the abutment are decoupled from each other.

2. The dental implant according to claim 1, wherein complementary fastening between the first corresponding fastening portion provided on the elastic fastening leg and the first fastening portion provided on the inner surface of the axial hole of the fixture prevents the abutment from rotating against a predetermined level of torque or lower and prevents the abutment from being decoupled vertically from the fixture.

3. The dental implant according to claim 1, wherein an inclined surface is provided on the inner surface of the axial hole of the fixture, on which the first fastening portion is provided, except for a region of the inner surface in which the first fastening portion is provided, such that an inner diameter of the inclined surface continuously decreases in a bottom direction, and when a fastening protrusion of the first corresponding fastening portion is released from the fastening recess of the first fastening portion in response to the abutment being rotated in the circumferential direction, the fastening protrusion of the first corresponding fastening portion pushes the abutment upwards from the fixture due to elastic repulsion from the inclined surface of the inner surface of the axial hole of the fixture, thereby automatically decoupling the abutment and the fixture from each other.

4. The dental implant according to claim 1, wherein, at a same vertical position, an outer diameter of the inclined surface of the elastic non-fastening support leg is greater than an inner diameter of the corresponding inclined surface on the inner surface of the axial hole of the fixture, such that, when the abutment is coupled to the fixture, a constant level of force is applied to push the abutment upwards with respect to the fixture, so that the abutment is firmly located at a constant position with respect to the fixture.

5. The dental implant according to claim 1, wherein a slit is provided between the top portion of the abutment and the first fastening portion to linearly or spirally extend in a top-bottom direction of the abutment while dividing a cross-section of the abutment into a plurality of segments.

6. A dental implant comprising:
a fixture implanted in an alveolar bone to provide an artificial tooth root; and
an abutment comprising elastic legs respectively comprising a top portion coupled to a prosthesis and a bottom portion elastically coupled to an axial hole of the fixture,
wherein the elastic legs include an elastic fastening leg acting to couple the abutment to the fixture using elastic bending in an axial direction and restoring force and an elastic non-fastening support leg that does not directly participate in coupling of the abutment to the fixture,
wherein a first fastening portion is provided on an inner surface of the axial hole of the fixture, the first fastening portion comprising a fastening recess depressed outward, in a predetermined location on the inner surface of the axial hole, and a first corresponding fastening portion is provided on an outer circumferential surface of the elastic fastening leg to be complementarily coupled to the first fastening portion provided on the inner surface of the axial hole of the fixture, and has a fastening protrusion,
wherein the elastic non-fastening support leg has an inclined surface provided on a lower outer surface thereof to be inclined downward, and the fixture has a corresponding inclined surface provided on the inner surface of the axial hole, corresponding to the inclined surface of the elastic non-fastening support leg, such that vertical occlusal force applied to the abutment is effectively absorbed,
wherein the inclined surface of the elastic non-fastening support leg and the corresponding inclined surface on the inner surface of the axial hole of the fixture provide a mutually-coupled structure while being in contact with each other, such that, when occlusal force is applied to the abutment, the inclined surface of the elastic non-fastening support leg absorbs the occlusal force while slightly sliding along the corresponding inclined surface on the inner surface of the axial hole of the fixture,
wherein the first fastening portion comprises at least one first fastening portion provided in a circumferential direction of the inner surface of the axial hole of the fixture so as not to provide an annular shape along the entire circumference, such that the abutment is coupled to the fixture at a predetermined angle when the abutment is pushed into the fixture and the first corresponding fastening portion of the abutment is releasable from the first fastening portion when the abutment is rotated in the circumferential direction by a predetermined level of torque or higher applied thereto,
wherein a second corresponding fastening portion is provided on an outer circumferential surface of the elastic fastening leg, the second corresponding fastening portion comprising a fitting protrusion protruding from the outer circumferential surface of the elastic fastening leg in an outer diameter direction to prevent the abutment from being vertically decoupled from the fixture, and a second fastening portion is provided on the inner surface of the axial hole of the fixture, the second fastening portion comprising a stepped portion extending outward to be coupled to the second corresponding fastening portion in a corresponding manner, and
wherein, when the first fastening portion and the first corresponding fastening portion are fastened to each other, the second corresponding fastening portion and the second fastening portion are fastened to each other to enhance axial coupling force between the abutment and the fixture, and when the first corresponding fastening portion is released from the first fastening portion in response to the abutment rotating in the circumferential direction, the second corresponding fastening portion is automatically released from the second fastening portion provided on the inner surface of the axial hole of the fixture by elastic bending of the elastic fastening leg of the abutment in an inner diameter direction, so that the fixture and the abutment are decoupled from each other.

7. The dental implant according to claim 6, wherein a slit is provided between the top portion of the abutment and the first fastening portion to linearly or spirally extend in a top-bottom direction of the abutment while dividing a cross-section of the abutment into a plurality of segments.

8. The dental implant according to claim 6, wherein the second fastening portion comprises an annular stepped portion provided in a predetermined vertical position on the inner surface of the axial hole of the fixture to extend along an entire circumference or a fastening recess, depressed outward in a predetermined location.

9. A dental implant comprising:
a fixture implanted in an alveolar bone to provide an artificial tooth root; and
an abutment comprising elastic legs respectively comprising a top portion coupled to a prosthesis and a bottom portion elastically coupled to an axial hole of the fixture,
wherein the elastic legs include an elastic fastening leg acting to couple the abutment to the fixture using elastic bending in an axial direction and restoring force and an elastic non-fastening support leg that does not directly participate in coupling of the abutment to the fixture,
wherein a first fastening portion is provided on an inner surface of the axial hole of the fixture, the first fastening portion comprising a fastening recess depressed outward, in a predetermined location on the inner surface of the axial hole, and a first corresponding fastening portion is provided on an outer circumferential surface of the elastic fastening leg to be complementarily coupled to the first fastening portion provided on the inner surface of the axial hole of the fixture, and has a fastening protrusion,
wherein the first fastening portion comprises at least one first fastening portion provided in a circumferential direction of the inner surface of the axial hole of the fixture so as not to provide an annular shape along the entire circumference, such that the abutment is coupled to the fixture at a predetermined angle when the abutment is pushed into the fixture and the first corresponding fastening portion of the abutment is releasable from the first fastening portion when the abutment is rotated in the circumferential direction by a predetermined level of torque or higher applied thereto,
wherein a second corresponding fastening portion is provided on an outer circumferential surface of the elastic fastening, the second corresponding fastening portion comprising a fitting protrusion protruding from the outer circumferential surface of the elastic fastening leg in an outer diameter direction to prevent the abutment from being vertically decoupled from the fixture, and a second fastening portion is provided on the inner surface of the axial hole of the fixture, the second fastening portion comprising a stepped portion extending outward to be coupled to the second corresponding fastening portion in a corresponding manner, and wherein, when the first fastening portion and the first corresponding fastening portion are fastened to each other, the second corresponding fastening portion and the second fastening portion are fastened to each other to enhance axial coupling force between the abutment and the fixture, and when the first corresponding fastening portion is released from the first fastening portion in response to the abutment rotating in the circumferential direction, the second corresponding fastening portion is automatically released from the second fastening portion provided on the inner surface of the axial hole of the fixture by elastic bending of the elastic fastening leg of the abutment in an inner diameter direction, so that the fixture and the abutment are decoupled from each, wherein the axial hole of the fixture is configured such that a diameter of the inner surface thereof above the first fastening portion is not smaller than an outer diameter of the first corresponding fastening portion, so that the first corresponding fastening portion enters the first fastening portion without significant resistance, thereby allowing a coupling angle and position of the fixture and the abutment to be easily determined.

* * * * *